Patented Sept. 14, 1937

2,092,903

UNITED STATES PATENT OFFICE 2,092,903

METHODS OF COATING ABRASIVE GRAIN

Raymond C. Benner and Romie L. Melton, Niagara Falls, N. Y., assignors, by mesne assignments, to The Carborundum Company, Niagara Falls, N. Y., a corporation of Delaware No Drawing. Application December 16, 1933, Serial No. 702,832

3 Claims. (Cl. 91—68)

This invention relates to the manufacture of abrasive grains and more particularly to the production of loose non-adherent abrasive grains each having a film of bonding material. More particularly the invention relates to a method of treating a mass of non-adherent abrasive grains; to coat each grain with a film of bonding material which is dry and not adhesive to surrounding grains.

The invention contemplates treating a loose mass of abrasive grains with a liquid bonding material to coat each grain of the mass with a film of the bonding material, dispersing the grains to individually separate them, and maintaining the dispersed grains separate from each other in an atmosphere tending to harden or set at least the surface of the films so that when collected, the grains will not adhere and can be handled and stored in the same manner as uncoated abrasive grains.

The bonding material used may be any material which can be used as a liquid or in solution to coat the grains, and which will harden or set under suitable conditions to form a film which will not adhere to a similar film under the conditions of storage and handling; but which can be made to adhere under other conditions. For example; glues, varnishes, lacquers, synthetic resins, cellulose compounds, drying oils and other well known bonding materials may be used. Generally the materials used fall into four groups. They are (1) those which harden by evaporation of solvents; such as lacquers, glues, cellulose solutions, and certain natural and synthetic resins, (2) those which are hardened by heat; such as the synthetic resins marketed under the trade name "Redmanol", (3) thermoplastic materials; such as shellac, and (4) materials which harden by oxidation; such as materials having a base of tung oil or linseed oil.

According to the method of the present invention the liquid bonding material is made up as hereinafter described and applied to a mass of individually separate grains to coat the individual grains. The grains are then dispersed to separate them and cause the film of liquid material on the grains to dry or set before the grains are collected or contact with other solid material.

For any particular size of abrasive grain, the thickness of the film which can be applied, can be controlled to any desired degree, by varying the proportion of bonding material used and by varying the viscosity of the liquid bonding material.

According to one modification of the present invention the granular abrasive and liquid bonding material are mixed and the mixture sprayed from a nozzle of suitable size. By this arrangement abrasive grains, of the sizes generally used in the manufacture of abrasive coated paper and cloth and abrasive grinding wheels, can be successfully sprayed or dispersed. The size of the orifice required will, of course, vary with the size of the abrasive granules; a larger opening being used for the larger grain sizes.

Another modification of the invention comprises making a mixture of abrasive grains and liquid bonding material, extruding the mixture from a suitable orifice, and directing one or more gaseous streams against the mixture as it emerges from the orifice to break up the mixture so that the coated grains will be individually separated.

By still another modification a stream or streams of atomized liquid bonding material are directed into a stream of abrasive grains so as to individually coat the abrasive grains, and also to break up and disperse the stream of grains.

With any of the above modifications the method of the present invention includes passing the dispersed grains through a gaseous medium of a character and condition dependent on the nature of the bonding material used, to cause the films of bonding material on the individual grains to harden before the coated grains come into contact with each other or the walls of a suitable container.

Abrasive granules coated by the herein described process are found to be entirely coated with a film of bonding material. In addition, this film of bonding material is uniformly distributed over the surface of the individual granules, regardless of the size or irregular shape of such grains.

In using bonding materials of the type which harden by evaporation of solvents, the mixture may be sprayed into a warm atmosphere to facilitate the evaporation. To recover the solvents, the air into which the mixture is sprayed is passed to a suitable recovery system and then used as a source of air for the spraying device which prevents the loss of small amounts not recoverable.

The use of bonding materials hardened by heat involves controlling the heating to cause only enough curing of the bonding material or resin used to render the surface coating hard and not adhesive, and prevent curing the resin to an infusible material. The curing necessary may be only enough to harden and dry the surface of the film. The temperature to which the resins are heated to accomplish the proper curing vary from about 150° to about 400° F. Some bonding materials of this type require a certain amount of solvent to facilitate forming the film on the particles or grains and a solvent recovery system is, therefore, desirable. A mass of abrasive grains coated with such a bonding material may be dispersed in an atmosphere at the proper temperature to evaporate the solvent and cure the resin properly; or a blast of heated air may be used to spray a mixture of grains and bonding material since the primary object is to harden or congeal the outer surface of the adhering film.

In using thermoplastic bonding materials they are heated to render them fluid and maintain them in that condition during the mixing with the abrasive grains and until the mixture is sprayed or dispersed. Grains coated with a thermoplastic material should be dispersed into a chilled atmosphere to harden the films before they contact.

In using a bonding material which hardens by oxidation, the hardening of the film is greatly accelerated by the use of an atmosphere rich in oxygen or ozone. To produce the ozone, the usual methods, which include corona discharge and ultra violet rays, may be used.

It will be noted that the above classification of bonding materials is based on the method necessary or desired to harden the films. Some bonding materials may be placed in two or more classes. For example, it has been noted that certain materials which harden by heat also need the use of solvents to facilitate the coating of the grains. Also certain thermoplastic materials may be used dissolved in solvents, as in the first group.

Still another modification of the present invention involves subjecting the coated granules, while dispersed, to the action of a suitable liquid fluid medium. For example, grains coated with a liquid thermoplastic bonding material may be dropped into a chilled body of non-reactive, non-solvent liquid to harden the film. Or, grains having films of a liquid heat hardenable bonding material may be dropped into a body of non-reactive, non-solvent liquid heated to a suitable temperature.

There are instances, such as in the positioning of grain by magnetic means, where it is desirable to increase the magnetic susceptibility of abrasive grains. This is accomplished by the addition of magnetic material, such as iron or iron oxide to the surface of said grain. The present process is particularly adaptable to this operation since the magnetic material may be mixed with a suitable liquid bonding material and applied by any of the methods described above.

While the method of dispersion may be chosen with regard to the surface tension or viscosity of the liquid material used, bonding materials from any of the four classes mentioned may be used with any of the described methods of dispersing the grains or any combination of them. For example, a mixture of melted shellac and abrasive grain may be sprayed into a chilled atmosphere with a suitable spray gun or extruded through an orifice, and the stream of coated grains dispersed by streams of gas directed at the mixture as it emerges from the orifice; the dispersed grains then passing through a chilled atmosphere. A resin bonding material, such as liquid "Redmanol", with or without the addition of solvent may be mixed with abrasive grains and the mixture sprayed through a nozzle with a blast of heated air, or extruded through an orifice and dispersed by streams of gas, as above. These coated, dispersed grains are then passed through an atmosphere at the proper temperature to evaporate the solvent, and cure the resin films to the proper degree. As a further example, glue dissolved in a suitable solvent may be mixed with abrasive grains and the mixture sprayed into a warm atmosphere, or the adhesive may be atomized and sprayed into a stream of abrasive grains, coating and dispersing them. These coated grains pass through a warm atmosphere to evaporate the solvent.

It will thus be seen that the present invention provides a method whereby abrasive grains may be treated in bulk to coat the individual grains with a film of bonding material, and produce coated grains which are non-adherent and which may be handled or stored under normal conditions like uncoated grains. The grains produced by this method are enveloped completely in individual films of bonding material and may be used in the production of coated abrasive articles, such as paper and cloth and also bonded abrasive articles, such as grinding wheels, cut-off wheels, and the like.

We claim:

1. The method of producing a film of bonding material on the individual grains of a mass of non-adherent abrasive grains which comprises applying a film of solvent containing a synthetic resin bonding material dissolved therein to the grains in mass to form a compact mass of wetted grains, thereafter dispersing the mass of wetted grains in a gaseous medium to individually separate them, and maintaining the said dispersion to permit the solvent to evaporate from the individual films while the grains are so separated.

2. The method of producing a film of bonding material on the individual grains of a mass of non-adherent abrasive grains which comprises applying a film of solvent containing a heat hardenable resin dissolved therein to the grains in mass to form a compact mass of wetted grains, dispersing the mass of wetted grains in a gaseous medium to individually separate them, and maintaining the said dispersion in a heated gaseous medium to permit the solvent to evaporate from the individual films and permit the films to harden to the desired degree while the grains are so separated.

3. The method of producing a film of bonding material on the individual grains of a mass of non-adherent abrasive grains which comprises applying a liquid film containing heat hardenable resin to the grains in mass to form a compact mass of wetted grains, dispersing the mass of wetted grains in a fluid medium to individually separate them, and maintaining the said dispersion in a heated fluid medium to permit the individual films to harden to the desired degree while the grains are so separated.

RAYMOND C. BENNER.
ROMIE L. MELTON.